United States Patent
Trim et al.

(10) Patent No.: US 11,392,892 B2
(45) Date of Patent: Jul. 19, 2022

(54) AUGMENTED REALITY VISUALIZATION OF PRODUCT SAFETY

(71) Applicant: INTERNATIONAL BUSINESS MACHINES CORPORATION, Armonk, NY (US)

(72) Inventors: Craig M. Trim, Ventura, CA (US); John M. Ganci, Jr., Raleigh, NC (US); Hernan A. Cunico, Holly Springs, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/247,400

(22) Filed: Dec. 10, 2020

(65) Prior Publication Data

US 2022/0188750 A1   Jun. 16, 2022

(51) Int. Cl.

| | |
|---|---|
| *G06Q 30/00* | (2012.01) |
| *G06Q 10/08* | (2012.01) |
| *G06Q 30/02* | (2012.01) |
| *G06Q 30/06* | (2012.01) |
| *G06N 5/04* | (2006.01) |
| *G06F 3/14* | (2006.01) |
| *G06N 20/00* | (2019.01) |

(52) U.S. Cl.
CPC ............ *G06Q 10/087* (2013.01); *G06F 3/14* (2013.01); *G06N 5/04* (2013.01); *G06N 20/00* (2019.01); *G06Q 30/0223* (2013.01); *G06Q 30/0631* (2013.01); *G06Q 30/014* (2013.01)

(58) Field of Classification Search
None
See application file for complete search history.

(56) References Cited

U.S. PATENT DOCUMENTS

| | | | |
|---|---|---|---|
| 6,826,119 B2 | 11/2004 | Fortune | |
| 7,065,501 B1 | 6/2006 | Brown | |
| 7,918,399 B2 | 4/2011 | Silverbrook | |
| 9,547,851 B2 | 1/2017 | Brown | |
| 10,552,933 B1 | 2/2020 | Calhoon | |
| 2002/0016739 A1* | 2/2002 | Ogasawara | G06K 17/0022 |
| | | | 705/22 |
| 2004/0100380 A1 | 5/2004 | Lindsay | |
| 2007/0235528 A1* | 10/2007 | Spencer | G06Q 20/203 |
| | | | 235/383 |

(Continued)

OTHER PUBLICATIONS

Anonymous, "Method and System for Analyzing Supply and Demand Conditions of Products and Displaying Product Prices in Real-time," IP.com, Sep. 29, 2009, 3 pages, IP.com No. IPCOM000188290D.

(Continued)

*Primary Examiner* — Matthew T Sittner
(74) *Attorney, Agent, or Firm* — Elliot J. Shine

(57) ABSTRACT

A method, computer system, and a computer program product for product safety is provided. The present invention may include scanning a product inventory. The present invention may include classifying one or more products within the product inventory based on an expiration evaluation. The present invention may include applying a price discount or a display modification notification based on a classification of the one or more products.

16 Claims, 6 Drawing Sheets

(56) References Cited

U.S. PATENT DOCUMENTS

| | | | | |
|---|---|---|---|---|
| 2009/0099988 | A1* | 4/2009 | Stokes | G06F 15/16 |
| | | | | 706/20 |
| 2010/0238521 | A1 | 9/2010 | Rusman | |
| 2012/0095823 | A1 | 4/2012 | Tak | |
| 2014/0002643 | A1* | 1/2014 | Aziz | G06F 3/011 |
| | | | | 705/26.1 |
| 2014/0214547 | A1 | 7/2014 | Signorelli | |
| 2015/0310601 | A1 | 10/2015 | Rodriguez | |
| 2016/0086255 | A1* | 3/2016 | Sainfort | G06Q 30/0613 |
| | | | | 705/26.82 |
| 2016/0342936 | A1* | 11/2016 | Milum | H04B 5/0062 |
| 2016/0357801 | A1 | 12/2016 | Knobel | |
| 2018/0209901 | A1 | 7/2018 | Schwartzer | |
| 2019/0138975 | A1* | 5/2019 | Zuberi | G06Q 10/087 |
| 2019/0295148 | A1* | 9/2019 | Lefkow | G06Q 10/0833 |
| 2019/0378155 | A1* | 12/2019 | Wong | G06Q 30/0284 |
| 2021/0366590 | A1* | 11/2021 | Soh | G06K 9/6259 |

OTHER PUBLICATIONS

Ceasrine, "How to Tell Whether Expired Food Is Safe to Eat," Consumer Reports, Sep. 21, 2019 [accessed an Aug. 31, 2020], 5 pages, Retrieved from the Internet: <URL: https://www.consumerreports.org/food-safety/how-to-tell-whether-expired-food-is-safe-to-eat/>.

Dedezade, "Ensuring no food gets left behind with AI," Microsoft.com, Apr. 1, 2019 [accessed on Aug. 31, 2020], 4 pages, Retrieved from the Internet: <URL: https://news.microsoft.com/europe/features/ensuring-no-food-gets-left-behind-with-ai/>.

Hazimihalis, "These Grocery Store Waste Statistics Are a Wake Up Call," Dumpsters.com Blog, Oct. 31, 2018 [accessed on Aug. 31, 2020], 9 pages, Retrieved from the Internet: <URL: https://www.dumpsters.com/blog/grocery-store-food-waste-statistics>.

IBM Industries, "Retail technology for the evolving consumer landscape," Retail Technology Solutions, [accessed on Dec. 10, 2020], 5 pages, Retrieved from the Internet: <URL: https://www.ibm.com/industries/retail-consumer-products>.

IBM, "IBM Food Trust. A new era for the world's food supply.", IBM Food Trust—Blockchain for the world's food supply, [accessed on Aug. 31, 2020], 12 pages, Retrieved from the Internet: <URL: https://www.ibm.com/blockchain/solutions/food-trust>.

IBM, "IBM Maximo Visual Inspection," Maximo Visual Inspection—Overview, [accessed on Dec. 10, 2020], 7 pages, Retrieved from the Internet: <URL: https://www.ibm.com/products/ibm-maximo-visual-inspection>.

IBM, "IBM Watson Machine Learning," IBM Cloud, [accessed on Dec. 10, 2020], 21 pages, Retrieved from the Internet: <URL: https://www.ibm.com/cloud/machine-learning>.

IBM, "Watson Natural Language Classifier," Watson Natural Language Classifier—Overview, [accessed on Aug. 31, 2020], 6 pages, Retrieved from the Internet: <URL: https://www.ibm.com/cloud/watson-natural-language-classifier>.

IBM, "Watson Visual Recognition," IBM Cloud, [accessed on Aug. 31, 2020], 8 pages, Retrieved from the Internet: <URL: https://www.ibm.com/cloud/watson-visual-recognition>.

Jacobs, "Why Grocery Stores Like Trader Joe's Throw Out So Much Perfectly Good Food," Business Insider, Oct. 15, 2014 [accessed on Aug. 31, 2020], 8 pages, Retrieved from the Internet: <URL: https://www.businessinsider.com/why-grocery-stores-throw-out-so-much-food-2014-10>.

Lumpur, "Samsung zeros in on food wastage and offers an innovative solution to reduce it," Samsung Newsroom Malaysia, Nov. 2, 2016 [accessed on Aug. 31, 2020], 3 pages, Retrieved from the Internet: <URL: https://news.samsung.com/my/samsung-zeros-in-on-food-wastage-and-offers-an-innovative-solution-to-reduce-it>.

Mazen, et al., "Ripeness Classification of Bananas Using an Artificial Neural Network," Arabian Journal for Science and Engineering, Jan. 2019, 11 pages, King Fahd University of Petroleum & Minerals, https://doi.org/10.1007/s13369-018-03695-5, Retrieved from the Internet: <URL: https://www.researchgate.net/publication/330154837_Ripeness_Classification_of_Bananas_Using_an_Artificial_Neural_Network>.

Mell, et al., "The NIST Definition of Cloud Computing", National Institute of Standards and Technology, Special Publication 800-145, Sep. 2011, 7 pages.

Peters, "How Google saved over 6 million pounds of food waste in its cafés," Fast Company, Apr. 24, 2019 [accessed on Aug. 31, 2020], 6 pages, Retrieved from the Internet: <URL: https://www.fastcompany.com/90337779/now-google-saved-over-6-million-pounds-of-food-waste-in-its-cafes>.

Quest, "Food Waste Statistics, The Reality Of Food Waste," Quest Resource Management Group, [accessed on Aug. 31, 2020], 7 pages, Retrieved from the Internet: <URL: https://www.questrmg.com/2019/08/08/food-waste-statistics-the-reality-of-food-waste/>.

Wordwright, "IBM Sells POS Hardware Division for $850 Million," Point of Sale.com Press Releases, Aug. 30, 2012 [accessed on Dec. 10, 2020], 9 pages, Retrieved from the Internet: <URL: https://pointofsale.com/IBM-sells-pos-hardware-division-for-850-million/>.

IBM, "IBM Watson Studio: Build and scale trusted AI on any cloud. Automate the AI lifecycle for ModelOps," IBM.com [online], Jan. 19, 2022 [accessed on Jan. 25, 2022], 12 pages, Retrieved from the Internet: <URL: https://www.ibm.com/cloud/watson-studio>.

IBM, "Retail technology solutions," IBM.com [online], Jan. 16, 2022 [accessed on Jan. 25, 2022], 5 pages, Retrieved from the Internet: <URL: https://www.ibm.com/industries/retail>.

* cited by examiner

AUGMENTED REALITY VISUALIZATION OF PRODUCT SAFETY

BACKGROUND

The present invention relates generally to the field of computing, and more particularly to augmented reality systems.

Maintaining a safe inventory may be a critical part of a business (e.g., a food sale business). Maintaining a safe inventory may include, but is not limited to including, removing expired and recalled products. With respect to tagged products there may be ambiguity amongst the terms used to denote expiration, such as, but not limited to, "sell by," "use by," and "best if used by/before." Expiration dates for things such as food, medicines, and beauty products may not be regulated by the USDA (United States Department of Agriculture) or the FDA (Food and Drug Administration) and may be added at the discretion of the company. With respect to untagged products, such as, for example, fruits and vegetables, identifying expired products may involve the subject evaluation by either a store clerk or a customer.

The manual process of identifying expired or recalled products may be both inefficient and prone to errors.

SUMMARY

Embodiments of the present invention disclose a method, computer system, and a computer program product for product safety. The present invention may include scanning a product inventory. The present invention may include classifying one or more products within the product inventory based on an expiration evaluation. The present invention may include applying a price discount or a display modification notification based on a classification of the one or more products.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
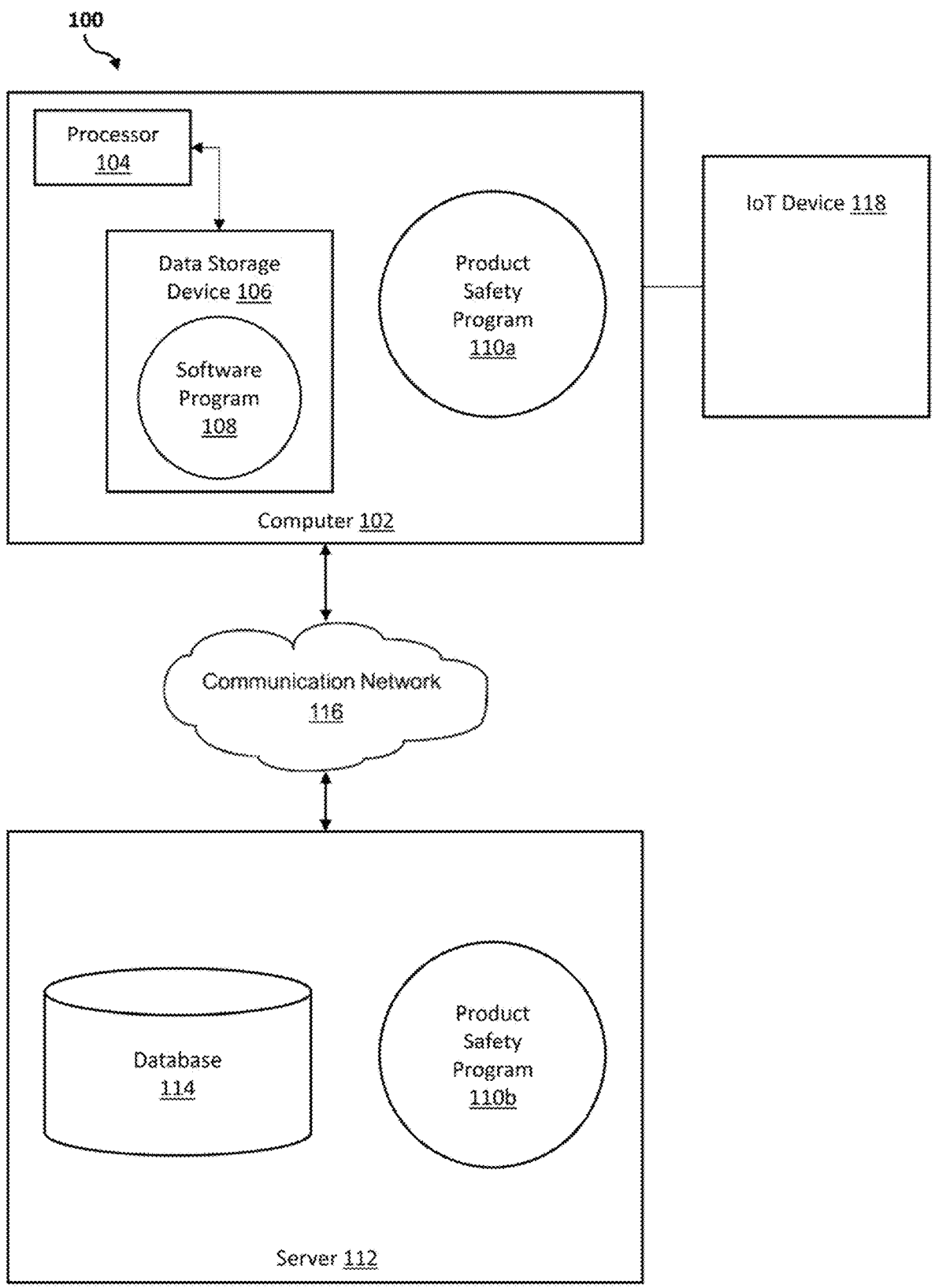
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for product safety. As such, the present embodiment has the capacity to improve the technical field of augmented reality systems by providing a visual display to a user, wherein the visual display utilizes augmented reality in displaying classifications of one or more products within the product inventory. More specifically, the present invention may include scanning a product inventory. The present invention may include classifying one or more products within the product inventory. The present invention my include applying a price discount or a display modification notification based on a classification of the one or more products.

As described previously, maintaining a safe inventory may be a critical part of a business (e.g., a food sale business). Maintaining a safe inventory may include, but is not limited to including, removing expired and recalled products. With respect to tagged products there may be ambiguity amongst the terms used to denote expiration, such as, but not limited to, "sell by," "use by," and "best if used by/before." Expiration dates for things such as food, medicines, and beauty products may not be regulated by the USDA (United States Department of Agriculture) or the FDA (Food and Drug Administration) and may be added at the discretion of the company. With respect to untagged products, such as, for example, fruits and vegetables, identifying expired products may involve the subject evaluation by either a store clerk or a customer.

The manual process of identifying expired or recalled products may be both inefficient and prone to errors.

Therefore, it may be advantageous to, among other things, scan a product inventory, classify one or more products within the product inventory, and apply a price discount or a display modification notification based on a classification of the one or more products.

According to at least one embodiment, the present invention may improve the identifying of expired products by providing a visual display to the user, wherein the visual display includes an expiration date. The expiration date displayed may be determined based on a database, wherein the database may provide a unified system allowing a user to understand what the expiration date is for each product of the product inventory.

According to at least one embodiment, the present invention may improve product waste by applying a price discount based on a classification of the one or more products.

According to at least one embodiment, the present invention may improve the evaluation of product inventory by utilizing a trained classification model to classify one or more untagged products. This may reduce the subjectivity involved in evaluating untagged products.

According to at least one embodiment, the present invention may improve the identification of recalled products by scanning a product inventory before shelving.

According to at least one embodiment, the present invention may improve the evaluation of untagged products by providing a uniform system that removes the subjectivity involved in evaluating untagged products.

According to at least one embodiment, the present invention may include a trained model which classifies one or more products within the product inventory. The trained model may take as input images of the product inventory in various states. The trained model may utilize default classifications, these default classifications may be adjusted by the user.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a product safety program 110a. The networked computer environment 100 may also include a server 112 that is enabled to run a product safety program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The IoT device 118 is depicted as shown as its own separate entity but could be part of any other part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the product safety program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the product safety program 110a, 110b (respectively) to scan product inventory, classify one or more products within the product inventory, and apply a price discount or a display modification notification based on a classification of the one or more products. The product method is explained in more detail below with respect to FIGS. 2 and 3.

Figure 2:
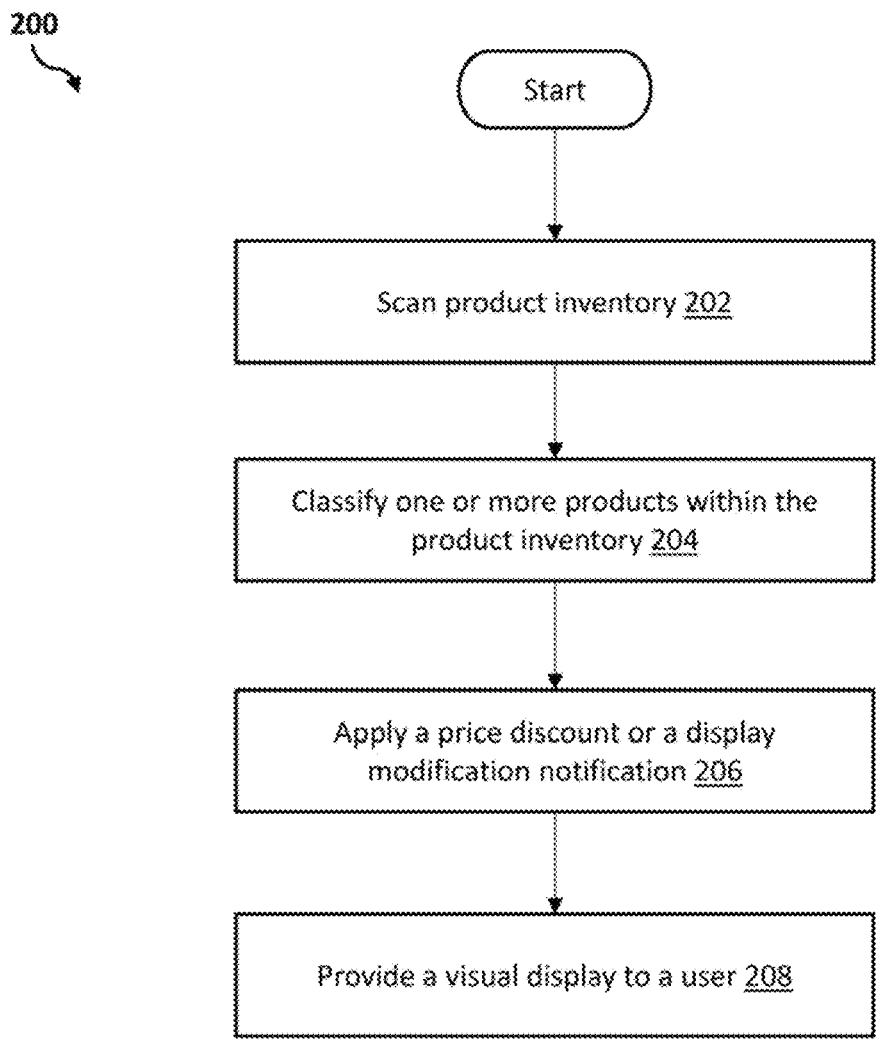
FIG. 2 is an operational flowchart illustrating a process for product safety according to at least one embodiment.

Referring now to FIG. 2, an operational flowchart illustrating the exemplary product safety process 200 used by the product safety program 110a and 110b (hereinafter product safety program 110) according to at least one embodiment is depicted.

At 202, the product safety program scans a product inventory. The product safety program 110 may utilize an IoT (Internet of Things) device 118 in scanning the product inventory. The IoT device 118 that may be used to scan the product inventory include, but are not limited to, smartphones, smart glasses, smart shelves, smart refrigerators, grocery store scanners, bar code scanners, RFID (Radio Frequency Identification) scanners, QR code scanners, amongst others. The product safety program 110 may be installed on the IoT device 118 or the IoT device 118 may access the product safety program 110 through a downloadable application. The IoT device 118 may scan the product inventory using for example, the image capturing of the IoT device 118 such as, the camera of a smartphone or a scanning component of the IoT device, such as, the CCD (Charge-coupled device) array of a scanner.

The product inventory may be comprised of at least tagged and untagged products. Tagged products may be affixed with a tag, such as, but not limited to, an RFID tag, barcode tag, QR (Quick Response) code tag, UPC (Universal Product Code) tag, 1D (1 Dimensional) barcodes, 2D (2 Dimensional) barcodes, different types of labels, amongst others. The tag may contain a variety of information with respect to the tagged product, such as, but not limited to, product type, identification numbers, recall status, product model, origin location, country of origin, date of manufacturing, name of manufacturer, price of the product, amongst other information.

Untagged products are not affixed with a tag. Accordingly, the variety of information available on the tag of a tagged product may not be available for untagged products. A user may be tasked with assessing untagged products to determine whether they are fresh, safe, or effective. For example, untagged products may include produce such as fruits and vegetables, as well as products such as a toothbrush or a car tire.

The product safety program 110 may include a catalog of products (e.g., database 114, knowledge base, knowledge corpus). The catalog of products (e.g., database 114, knowledge base, knowledge corpus) may be a unified system comprised of a knowledge base with respect to the product inventory as well as images with respect to the product inventory. The knowledge base may be comprised of information with respect to the expiration date for each product of the product inventory. For example, different tagged products may be affixed with one or several terms used to denote expiration by a company, such as, but not limited to, "sell by," "use by," "best if used by," "best if used before," "best by," "made on," "manufactured on," amongst others. The company may also use abbreviations such as "mfg" for "manufactured on," use letters for months such as "A" for January, and variations of date sequencing, such as month/date/year or year/month/date. The knowledge base may provide a unified system allowing a user to understand what the expiration date is for each product of the product inventory.

The images with respect to the product inventory may be images of the product inventory in various states. An untagged product such as a banana may have various states, such as underripe, barely ripe, ripe, very ripe, overripe, and expired. The catalog of products (e.g., database 114, knowledge base, knowledge corpus) may have images of one or more bananas transitioning from underripe to expired. Each of those states may be part of a classification. The classifications may be default classifications manually determined. The default classifications may be adjusted by the supplier (e.g., vendor, seller). These images and classifications may be utilized by a trained learning model, as will be described in more detail below with respect to steps 204 and 206.

The images with respect to the product inventory may also include images that if identified by the product safety program 110 may be flagged. The trained model may be utilized by the product safety program 110 to flag product inventory with defects, defects include, but are not limited to including, mold, bugs, and dents in canned goods.

For example, with respect to an untagged product such as a banana. Images of the product inventory may have images periodically taken of a banana over its shelf life, from underripe to expired. The default classifications may include every state, states such as, underripe, barely ripe, ripe, very ripe, overripe, and expired. The point at which the banana transitions from one classification to the next may be determined based features such as color and spots, amongst other features. The default classifications may be that when a banana reaches a certain yellow it is ripe, after spots are detected the banana is classified as very ripe, and after a certain number of spots or change in color the banana is overripe. The default classifications may be manually determined. As will be explained in more detail below, the product safety program 110 utilizing an IoT device may scan the product, the image is classified by the trained model, and the product safety program 110 may apply a price discount or a display modification notification based on a classification of the one or more products. Additionally, as will be explained in more detail below, these default classifications may be adjusted by the supplier (e.g., vendor, seller).

Scanning of the product inventory may have different applications depending on the user. The user may be a supplier (e.g., vendor, seller), consumer (e.g., customer, buyer), amongst others. Scanning the product inventory from a consumer perspective will be described in more detail with respect to FIG. 3 below.

For example, the supplier (e.g., vendor, seller), utilizing an IoT device, may scan the product inventory before shelving. The supplier may scan the product inventory before shelving for one or more reasons, such as, but not limited to, tracking product supply, recording the location of a product on one or more shelves, identifying a state of the product inventory, as well as tracking expiration dates, amongst others.

At 204, the product safety program classifies one or more products within the product inventory. The product safety program 110 may utilize a trained model in classifying the one or more products within the product inventory. The trained model may utilize the images with respect to the product inventory stored in the catalog of products (e.g., database 114, knowledge base, knowledge corpus). The product safety program 110 may classify the one or more products within the product inventory based on an expiration evaluation. The expiration evaluation may be performed by the trained model.

The trained model may be a classification model. The classification model may utilize binary classification in classifying one or more tagged products. Binary classification may refer to those classification tasks that have two class labels. The classification model may utilize one or more algorithms in performing a binary classification of the one or more tagged products, such as, but not limited to, logistic regression, k-nearest neighbor, decision trees, support vector machine, naïve bayes, amongst others.

For example, the supplier's IoT device 118, utilizing the product safety program 110, scans one or more tagged products in the product inventory. The IoT device may read the tag of the one or more tagged products. Utilizing the catalog of products (e.g., database 114, knowledge base, knowledge corpus), the binary classification model may classify the one or more tagged products with respect to one of two classifications with respect expiration (e.g., expired or unexpired), recalled status (e.g., recalled or not recalled), amongst others. In addition to the tag, the product safety program 110 may consider other factors such as dents in the packaging before determining expired or not expired. Following the determination, the supplier (e.g., vendor, seller) may either leave the tagged product or remove the tagged product.

The classification model may utilize multi-class classification in classifying one or more untagged products. Multi-classification may refer to those classification tasks that have more than two class labels. The classification model may use one or more algorithms in performing a multi-class classification of the one or more untagged products, such as, but not limited to, k-nearest neighbors, decision trees, naïve bayes, random forest, gradient boosting, amongst others. The product safety program 110 may utilize the multi-class classification model to classify the one or more untagged products based on the state of the untagged product. The model may be trained using the images with respect to product inventory detailed in step 202.

For example, the product safety program 110 may classify an untagged product such as a banana based on an expiration evaluation. The banana may have six different classifications, 1) underripe, 2) barely ripe, 3) ripe, 4) very ripe, 5) overripe, and 6) expired. For each classification there may be a starting edge and an ending edge for which a classification starts and ends. The classifications may have defining attributes such as color, the presence of spots, the number of spots, amongst others. The classifications may be default classifications. The default classifications may be adjusted by the supplier (e.g., vendor, seller).

As will be explained in more detail below with respect to 206, a price discount or a display modification may be based on the classification of the one or more products. Depending on the supplier (e.g., vendor, seller) the classifications may be adjusted based on preferences. The supplier (e.g., vendor, seller) may reduce or increase the number of classifications. The supplier (e.g., vendor, seller) may adjust the default classifications by moving the edge of a classification using the images of the product inventory stored in the catalog of products (e.g., database 114, knowledge base, knowledge corpus).

For example, the supplier (e.g., vendor, seller) may determine that the default classifications are classifying a banana as very ripe too early. The supplier (e.g., vendor, seller) may move the ending edge for ripe so that a banana is classified as ripe for a longer period of its shelf life. Moving the ending edge for ripe may reduce the price discount that may have been applied to the same banana under the default classifications, as will be described in more detail with respect to step 206 below.

At 206, the product safety program applies a price discount, or a display modification notification based on the classification of the one or more products. As will be described in more detail below with respect to steps 208 and 306 the price discount and the display modification notification may be displayed to the user by augmented reality (AR).

The product safety program 110 may have default price discounts based on the classification of the one or more products. The supplier (e.g., vendor, seller) may adjust the price discounts based on the classification of the one or more products. The classification of the one or more products may be based on the expiration evaluation.

The product safety program 110 may also consider one or more additional factors in applying a price discount, such as, but not limited to, quantity of expiring products, product expiration date, number of products in each classification, stock room inventory in addition to shelf inventory, scheduled shipments, customer shopping volume, customer shopping patterns, amongst others.

The product safety program 110 may also adjust the price discounts as more data is gathered with respect to the one or more additional factors of the supplier (e.g., vendor, seller).

Display modification notifications may provide additional relevant information with respect to the one or more products to the user, such as, but not limited to, recall status, flagged products, recommended products, expiration date, classification, estimated time remaining in the classification, amongst others.

For example, tagged products may classified by the trained model as expired or not expired. The product safety program 110 may apply price discounts based on the time left until expiration.

In another example, untagged products may be classified into five classifications. As an untagged product transitions from one classification to the next nearing expiration the product safety program may apply higher price discounts.

At 208, the product safety program provides a visual display to a user. The visual display may include, but is not limited to including, the price discount and the display modification notification. The product safety program 110 may utilize AR in providing the visual display to the user.

For example, an employee of the supplier (e.g., vendor, seller), utilizing an IoT device, may have a clear display of the product inventory and may be able to take actions such as, objectively remove products that are expired, move products to a discount section, remove products that are recalled, amongst other actions.

The IoT device at checkout may utilize the product safety program 110 to automatically apply the price discount or flag a recalled product.

Figure 3:
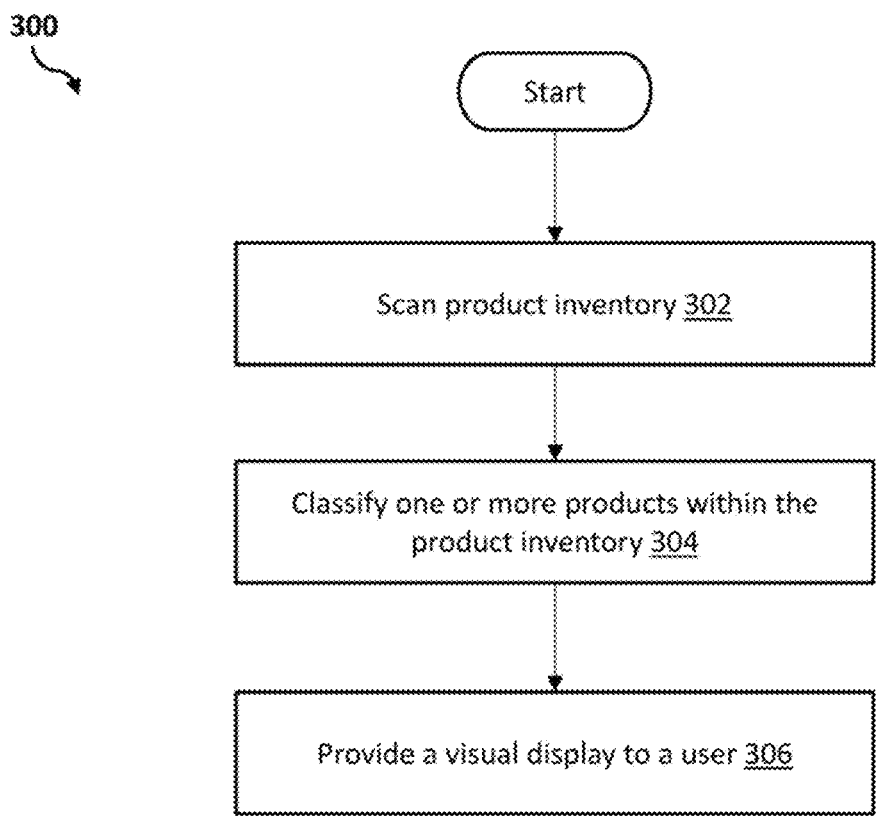
FIG. 3 is an operational flowchart illustrating a process for product safety from a consumer perspective according to at least one embodiment.

Referring now to FIG. 3, an operational flowchart illustration the product safety process 300 from a consumer perspective used by the product safety program 110 according to at least one embodiment is depicted.

At 302, the product safety program scans a product inventory. The consumer (e.g., customer, buyer) may utilize an IoT device 118 as described in step 202 in scanning the product inventory of the consumer.

The consumer may scan the product inventor of the consumer in order to allow the product safety program to at least, determine the state of the consumer's product inventory (e.g., product inventory of the consumer), determine a consumer's consumption rates (e.g., consumption rate of the consumer), learn the consumer's preferences with respect to products (e.g., product preferences of the consumer). The consumer's product inventory (e.g., inventory of the consumer), the consumer's preferences with respect to products, and the consumer's consumption rates may be stored in a consumer knowledge corpus. The consumer knowledge corpus may be stored in the database 114.

The consumer may provide the product safety program 110 with manual input. The manual input may be utilized to build the consumer knowledge corpus (e.g., consumer database), determine a consumer's consumption rates (e.g., consumption rate of the consumer), learn the consumer's preferences with respect to products (e.g., product preferences of the consumer). Manual input may include, but is not limited to including, scanning receipts, entering product information, connecting online purchase histories, amongst others.

For example, the consumer, utilizing an IoT device, may scan their pantry, counter, and refrigerator before going shopping. As will be explained in more detail with respect to step 306 below, the product safety program 110 may determine recommended products based on the scanning of the product inventory of the consumer.

The consumer may also scan untagged products in order to objectively evaluate the state of the product. For example, the consumer may scan their toothbrush to determine when to switch to a new toothbrush.

At 304, the product safety program classifies one or more products within the product inventory. The product safety program 110 may classify the one or more products within the product inventory of the consumer. The product safety program 110 may utilize the default classifications as described in step 204 in classifying the product inventory of the consumer.

The product safety program 110 may utilize the trained model described in step 204 in classifying the one or more products in the product inventory of the consumer.

At 306, the product safety program provides a visual display to a user. The visual display may include the price discount or display modification notifications applied in step 206 above.

The product safety program may determine a recommended product based on at least the consumer's product inventory (e.g., product inventory of the consumer), the consumer's consumption rates (e.g., consumption rate of the consumer), the consumer's preferences with respect to products (e.g., product preferences of the consumer). The recommended product may be provided in the visual display to the consumer.

For example, the consumer (e.g., customer, buyer) may be at a supplier (e.g., vendor, seller). Utilizing an IoT device such as a smart phone the consumer may scan the product inventory of the buyer. The consumer may see the price discount or the display modification notification for the one or more products of the inventory of the seller applied in step 206 above.

The product safety program 110 may utilize the visual display to display the recommended product for the consumer in the one or more products of the inventory of the seller.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
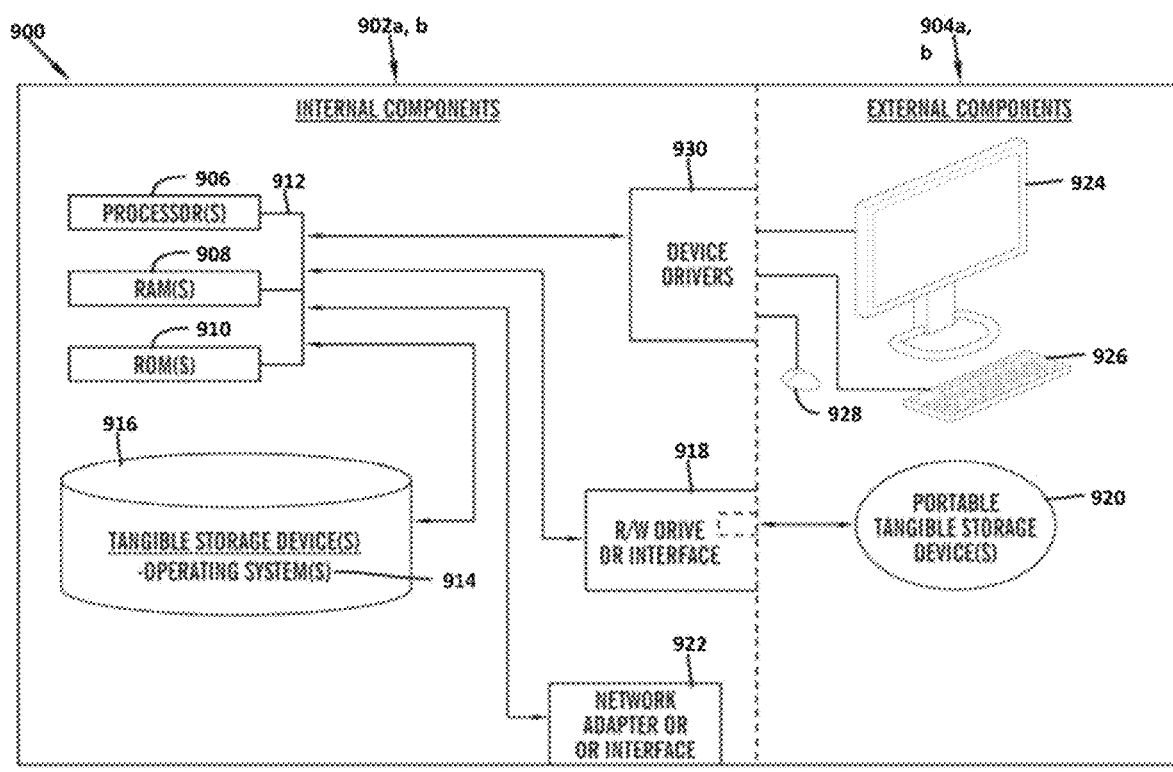
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the product safety program 110a in client computer 102, and the product safety program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a RAY drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the product safety program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the product safety program 110a in client computer 102 and the product safety program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the product safety program 110a in client computer 102 and the product safety program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
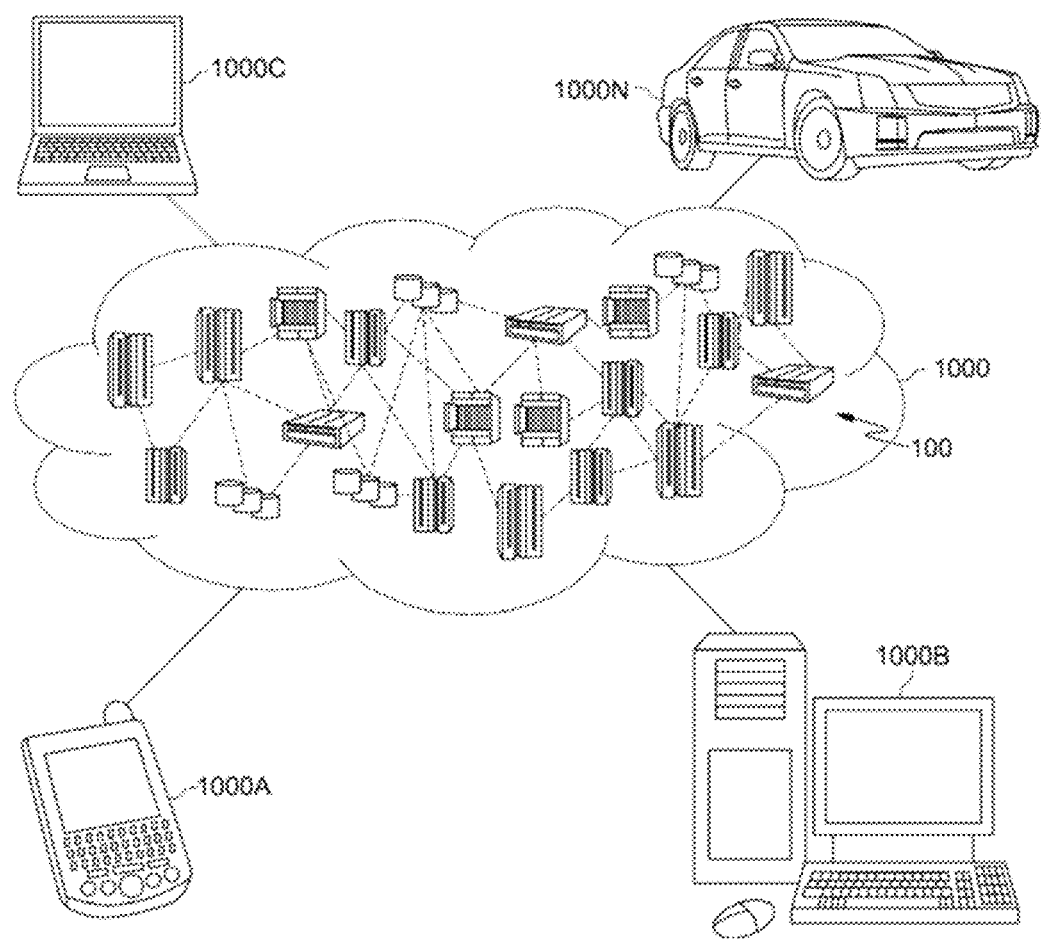
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
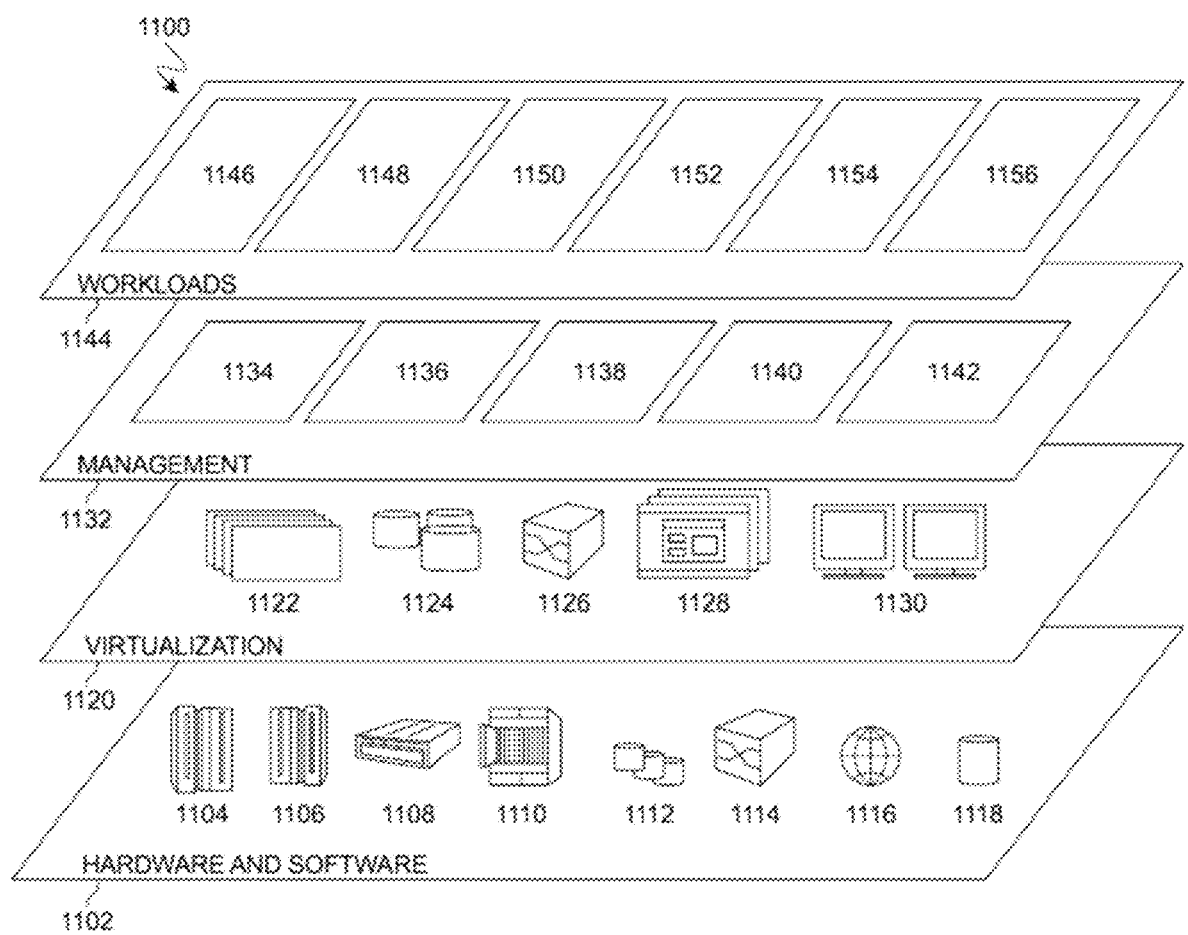
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and product safety 1156. A product safety program 110*a*, 110*b* provides a way to scan product inventory, classify one or more products within the product inventory, apply a price discount or a display modification notification based on a classification of the one or more products.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for product safety, the method comprising:
   scanning a product inventory utilizing a supplier IoT device, wherein the product inventory is comprised of one or more tagged products and one or more untagged products;
   performing an expiration evaluation of the product inventory using a trained model, wherein the trained model utilizes a catalog of products, wherein the catalog of products is a unified system comprised of a knowledge base and a plurality of images with respect to the product inventory, wherein the plurality of images includes one or more images of the product inventory in various states;

assigning a classification based on the expiration evaluation for each of the one or more tagged products and each of the one or more untagged products, wherein the trained model utilizes binary classification in assigning the classification for the one or more tagged products, and wherein the trained model utilizes multi-class classification in assigning the classification for the one or more untagged products based on a state of each of the one or more untagged product; and applying a price discount or a display modification notification based on at least the classification of the one or more products.

2. The method of claim 1, further comprising:
providing a visual display to a user, wherein the visual display utilizes augmented reality in displaying the price discount or the display modification notification associated with the one or more products.

3. The method of claim 1, further comprising:
determining a recommended product based on a consumer's product inventory, product preferences of the consumer, and consumption rates of the consumer.

4. The method of claim 1, wherein the one or more tagged products are assigned one of two classifications by the trained model based on information received upon scanning a tag associated with a tagged product by the supplier IoT device, wherein the information received is evaluated using the catalog of products.

5. The method of claim 1, wherein the one or more untagged products are assigned one of a plurality of classifications by the trained model based on an image received upon scanning an untagged product by the supplier IoT device, wherein the image of the untagged product is evaluated using the one or more images within the catalog of products of a corresponding untagged product in various states.

6. The method of claim 5, wherein each of the one or more images within the catalog of products is classified within one of the plurality of classifications based on the state of the untagged product, wherein various states of the untagged product are defined by one or more features or defining attributes.

7. The method of claim 6, wherein the plurality of classifications is adjusted by a supplier by moving an edge of a classification using the one or more images within the catalog of products to include or remove untagged products based on the one or more features or the defining attributes.

8. The method of claim 2, wherein the visual display is provided to the user on an IoT device.

9. The method of claim 3, wherein the consumer's product inventory, the product preferences of the consumer, and the consumption rates of the consumer are stored in a consumer knowledge corpus and determined based on one or more scans of a consumer product inventory and manual input received from a consumer.

10. The method of claim 3, wherein the recommended product is displayed to the user on a consumer IoT device.

11. A computer system for product safety, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

scanning a product inventory utilizing a supplier IoT device, wherein the product inventory is comprised of one or more tagged products and one or more untagged products;

performing an expiration evaluation of the product inventory using a trained model, wherein the trained model utilizes a catalog of products, wherein the catalog of products is a unified system comprised of a knowledge base and a plurality of images with respect to the product inventory, wherein the plurality of images includes one or more images of the product inventory in various states;

assigning a classification based on the expiration evaluation for each of the one or more tagged products and each of the one or more untagged products, wherein the trained model utilizes binary classification in assigning the classification for the one or more tagged products, and wherein the trained model utilizes multi-class classification in assigning the classification for the one or more untagged products based on a state of each of the one or more untagged product and applying a price discount or a display modification notification based on at least the classification of the one or more products.

12. The computer system of claim 11, further comprising:
providing a visual display to a user, wherein the visual display utilizes augmented reality in displaying the price discount or the display modification notification associated with the one or more products.

13. The computer system of claim 11, further comprising:
determining a recommended product based on a consumer's product inventory, product preferences of the consumer, and consumption rates of the consumer.

14. A computer program product for product safety, comprising:
one or more non-transitory computer-readable storage media and program instructions stored on at least one of the one or more tangible storage media, the program instructions executable by a processor to cause the processor to perform a method comprising:

scanning a product inventory utilizing a supplier IoT device, wherein the product inventory is comprised of one or more tagged products and one or more untagged products;

performing an expiration evaluation of the product inventory using a trained model, wherein the trained model utilizes a catalog of products, wherein the catalog of products is a unified system comprised of a knowledge base and a plurality of images with respect to the product inventory, wherein the plurality of images includes one or more images of the product inventory in various states;

assigning a classification based on the expiration evaluation for each of the one or more tagged products and each of the one or more untagged products, wherein the trained model utilizes binary classification in assigning the classification for the one or more tagged products, and wherein the trained model utilizes multi-class classification in assigning the classification for the one or more untagged products based on a state of each of the one or more untagged product and applying a price discount or a display modification notification based on at least the classification of the one or more products.

15. The computer program product of claim 14, further comprising:
providing a visual display to a user, wherein the visual display utilizes augmented reality in displaying the price discount or the display modification notification associated with the one or more products.

16. The computer program product of claim 14, further comprising:
determining a recommended product based on a consumer's product inventory, product preferences of the consumer, and consumption rates of the consumer.

* * * * *